United States Patent [19]

Kasuga et al.

[11] Patent Number: 4,511,708
[45] Date of Patent: Apr. 16, 1985

[54] PROCESS FOR MANUFACTURING POLYTETRAMETHYLENE TEREPHTHALATE

[75] Inventors: Takuzo Kasuga; Katsuhiko Takahashi; Kunio Suzuki, all of Fuji, Japan

[73] Assignee: Polyplastics Company, Ltd., Osaka, Japan

[21] Appl. No.: 575,414

[22] Filed: Jan. 31, 1984

[30] Foreign Application Priority Data

Feb. 1, 1983 [JP] Japan .................. 58-15172

[51] Int. Cl.³ .................. C08G 63/04; C08G 63/22
[52] U.S. Cl. .................. 528/274; 528/176; 528/286; 560/94
[58] Field of Search .................. 560/94; 528/274, 286, 528/176

[56] References Cited

U.S. PATENT DOCUMENTS

| 3,479,324 | 11/1969 | Carter et al. | 528/274 |
| 3,591,625 | 7/1971 | Twilley et al. | 528/274 X |
| 3,641,111 | 2/1972 | Lazarus | 528/274 X |
| 3,742,024 | 6/1973 | Ukai et al. | 560/94 |
| 4,056,514 | 11/1977 | Strehler et al. | 528/274 |
| 4,200,732 | 4/1980 | Horlbeck et al. | 528/274 |
| 4,439,597 | 3/1984 | Hall et al. | 528/274 X |

Primary Examiner—Lucille M. Phynes
Attorney, Agent, or Firm—Robert M. Shaw

[57] ABSTRACT

Polytetramethylene terephthalate is manufactured from terephthalic acid and 1,4-butanediol in two stages, a first stage comprising an esterification reaction employing an esterification catalyst and a second stage comprising a condensation-polymerization reaction. The esterification reaction is carried out in the presence of at least one acid amide compound, preferably selected from urea, a derivative thereof, mono- or poly-carboxylic acid amides having 1 to 9 carbon atoms, polyamides, phosphoric acid amides and sulfonic acid amides, whereby the production of tetrahydrofuran as a by-product is appreciably inhibited and the time required for the esterification reaction is reduced.

16 Claims, No Drawings

PROCESS FOR MANUFACTURING POLYTETRAMETHYLENE TEREPHTHALATE

FIELD OF THE INVENTION

The present invention relates to an improved process for manufacturing polytetramethylene terephthalate by direct polymerization of terephthalic acid and 1,4-butanediol as the main starting materials and particularly to a process for manufacturing polytetramethylene terephthalate using one or more novel esterification reaction accelerators.

BACKGROUND OF THE INVENTION

Generally, the manufacture of polytetramethylene terephthalate by the direct polymerization of terephthalic acid and 1,4-butanediol comprises a first stage reaction in which bis(4-hydroxybutyl) terephthalate and its low polymers are prepared by subjecting terephthalic acid and 1,4-butanediol to an esterification reaction, like the manufacturing method based on an ester-interchange process between dimethyl terephthalate and 1,4-butanediol as the starting materials, and a second stage reaction in which the product of the first stage is subjected to a condensation polymerization.

In the first stage esterification reaction of this direct polymerization process, the reaction will be notably delayed or will not advance at all beyond a certain stage, if the molar ratio of terephthalic acid to 1,4-butanediol and the reaction temperature are not specified within the specific ranges even in the presence of a catalyst.

Thus for the esterification reaction to be accomplished, the molar ratio of terephthalic acid/1,4-butanediol should preferably fall in the range of 1/1.6~1/2.0 and the reaction temperature in the range of 210°~230° C. Further, addition of a catalyst such as a titanium compound or a tin compound, is necessary.

However, an esterification reaction, even if the aforementioned conditions are met, involves problems in that 1,4-butanediol is readily dehydrated to close its ring owing to the acidity of terephthalic acid and heat, yielding tetrahydrofuran as a byproduct and giving rise to loss of 1,4-butanediol and the need for an extended period of time before completing the reaction.

Under these circumstances, the present inventors have made every effort in studies aimed at slashing the polymer manufacturing cost by acceleration of the esterification reaction, while inhibiting the formation of tetrahydrofuran as a byproduct, in the manufacture of polytetramethylene terephthalate by the direct polymerization process, and have found that notable curtailment of the esterification time as well as appreciable inhibition of the formation of tetrahydrofuran as a byproduct may be achieved by addition of an acid amide compound as the esterification reaction accelerator, which finding has led to this invention.

SUMMARY OF THE INVENTION

Polytetramethylene terephthalate is manufactured from terephthalic acid and 1,4-butanediol in two stages, a first stage comprising an esterification reaction employing an esterification catalyst and a second stage comprising a condensation-polymerization reaction. The esterication reaction is carried out in the presence of at least one acid amide compound, preferably selected from urea, a derivative thereof, mono- or polycarboxylic acid amides having 1 to 9 carbon atoms, polyamides, phosphoric acide amides and sulfonic acid amides, whereby the production of tetrahydrofuran as a by-product is appreciably inhibited and the time required for the esterification reaction is reduced.

DESCRIPTION OF THE PREFERRED EMBODIMENTS

Thus the present invention provides a process for manufacturing polytetramethylene terephthalate by the direct polymerization process using terephthalic acid and 1,4-butanediol as the major starting materials. A specific acid amide compound, which will be described later, is introduced before, in the initial stages of, or in portions during the esterification reaction between terephthalate and 1,4-butanediol which is carried out in the presence of a well-known catalyst. The molar ratio of terephthalic acid to 1,4-butanediol is within the range of 1:1.6 to about 1:2.0 and the reaction temperature is within the range of 210° to about 230° C. The esterification reaction in this instance is normally performed under normal pressure, though it may be run under a reduced pressure.

The acid amide compound used in this invention is a novel esterification reaction accelerator which has hitherto been unknown and, in particular, is selected from, e.g., urea or alkyl- or aryl-substituted ureas such as N-methylurea, N-ethylurea and N-phenylurea; urea derivatives such as dicyandiamide and melamine; acid amide compounds including mono- or poly-carboxylic acid amides having 1 to about 9 carbon atoms such as dimethylformamide and oxalamide, polyamides such as 6-nylon, 6.6-nylon and 12-nylon, phosphoric acid amides such as hexamethylphosphoramide, and sulfonic acid amides such as sulfamide; and one, two, or more of them are added in an amount of 0.0005 to about 5 weight %, preferably 0.001 to about 0.5 weight % based on terephthalic acid.

The well-known catalysts employed in the method of this invention include, e.g., tetramethyl titanate, tetra-isopropyl titanate, tetra-n-butyl titanate, tetra(2-ethylhexyl) titanate and their hydrolyzates or ester interchange products such as 1,4-butanediol titanate, potassium fluoridotitanate, titanium oxalate, dibutyltin oxide, monobutylhydroxytin oxide, and the like. The catalysts are added in an amount of 0.005 to about 0.2 weight % based on terephthalic acid.

Each of the acid amide compounds and catalysts may be used alone, but two or more of them may be used in combination. Their addition may be made before the esterification, in its initial stage, or in portions during the esterification reaction.

The polytetramethylene terephthalate of this invention which is formed from terephthalic acid and 1,4-butanediol may include, as a third component, polycarboxylic acids such as isophthalic acid, adipic acid, sebacic acid, hexahydroterephthalic acid, phenylidene dicarboxylic acid, or 2,6-naphthalene dicarboxylic acid, and polyols such as ethylene glycol, 2-methyl-1,3-propanediol, neopentyl glycol, 1,6-hexanediol, or bisphenol A. The composition may further contain, to serve respective purposes, other additives such as various phosphorus compounds, antioxidants, ultraviolet ray absorbers, pigments, nucleating agents, lubricants, fluorescent brightness, flame retardants, or inorganic fillers, e.g., glass fiber.

As described above, the present invention is characterized in that a specified acid amide compound is introduced before, in the initial stages of, or in portions during the esterification reaction between terephthalic acid and 1,4-butanediol which is performed in the presence of a well-known catalyst in manufacturing polytetramethylene terephthalate by the direct polymerization process. The process of this invention enables notable curtailment of the time period of the esterification reaction as well as appreciable inhibition of the formation of tetrahydrofuran as a byproduct.

EXAMPLES

This invention will be more fully understood from the descriptions taken hereunder in connection with its preferred embodiments and a comparative example. It should be noted that the intrinsic viscosity of polytetramethylene terephthalate was measured in o-chlorophenol at 25° C.

EXAMPLE 1

The esterification reaction was performed at 220° C., while distilling off the water formed, with 166 g of terephthalic acid, 153 g of 1,4-butanediol, 0.125 g of tetra-n-butyl titanate and 0.022 g of urea charged in a reactor provided with a fractionating column.

The time period required for terephthalic acid to dissolve (period of the esterification reaction) was 1 hour and 25 minutes and the amount of tetrahydrofuran contained in 53.9 g of distillate was 12.5 g. This reaction product was then transferred to a reactor for condensation polymerization and a condensation polymerization reaction was performed for 3 hours and 30 minutes with 0.1 g of tetra-n-butyl titanate added and with the pressure gradually reduced, while raising the temperature to 250° C., finally down to a degree of vacuum well below 1 Torr. The polymer obtained in this way had an intrinsic viscosity of 0.91.

EXAMPLE 2

The esterification reaction was carried out in a manner similar to the esterification described as in Example 1 except that the urea was replaced with the same amount of dicyandiamide. The time period of the esterification reaction was 1 hour and 23 minutes and the amount of tetrahydrofuran contained in 52.5 g of distillate was 12.2 g.

This reaction product was subjected to the condensation polymerization reaction in manner quite similar to the polymerization reaction described in Example 1. The polymer obtained had an intrinsic viscosity of 0.89.

EXAMPLE 3

The esterification reaction was carried out in a manner similar to the esterification described in Example 1 except that the urea was replaced with the same amount of hexamethylphosphoramide. The time period of the esterification reaction was 1 hour and 50 minutes and the amount of tetrahydrofuran contained in 52.7 g of distillate was 13.5 g.

This reaction product was subjected to the condensation polymerization reaction in a manner quite similar to the polymerization reaction in Example 1. The polymer obtained had an intrinsic viscosity of 0.90.

EXAMPLE 4

The esterification reaction was carried out in a manner similar to the esterification described in Example 1 except that the urea was replaced with 0.045 g of succinamide. The time period of the esterification reaction was 1 hour and 29 minutes and the amount of tetrahydrofuran contained in 54.8 g of distillate was 12.9 g. Then this reaction product was transferred to a reactor for condensation polymerization. The condensation polymerization reaction was performed for 3 hours with 0.1 g of tetra-n-butyl titanate added and with the pressure gradually reduced, while raising the temperature up to 250° C., finally down to a degree of vacuum below 1 Torr. The polymer obtained had an intrinsic viscosity of 0.88.

EXAMPLE 5

The esterification reaction was carried out in a manner similar to the esterification described in Example 4 except that the succinamide was replaced with 0.063 g of p-toluenesulfonamide. The time period of the esterification reaction was 1 hour and 34 minutes and the amount of tetrahydrofuran contained in 52.4 g of distillate was 13.1 g.

This reaction product was subjected to the condensation polymerization reaction in a manner quite similar to the polymerization reaction in Example 4. The polymer obtained had an intrinsic viscosity of 0.90.

COMPARATIVE EXAMPLE

The esterification reaction and the condensation polymerization reaction were carried out in a manner quite similar to the corresponding reactions in Example 1 except that urea was not added.

In this instance, the time period of the esterification reaction was 2 hours and 30 minutes and the amount of tetrahydrofuran contained in 58.3 g of distillate was 23.7 g. The polymer obtained has an intrinsic viscosity of 0.85.

The above-described results prove that in the absence of the acid amide compound of this invention, a longer time period for the esterification reaction is required and a larger amount of tetrahydrofuran is contained in the distillate, suggesting a greater loss of 1,4-butanediol.

We claim:

1. A process for manufacturing polytetramethylene terephthalate, comprising subjecting terephthalic acid and 1,4-butanediol to an esterification reaction in the presence of an esterification catalyst and then conducting a condensation-polymerization reaction of the esterification reaction product, the esterification reaction being carried out in the presence of at least one acid amide compound selected from the group consisting of urea, a derivative thereof, mono-carboxylic acid amides having 1 to 9 carbon atoms, poly-carboxylic acid amides having 1 to 9 carbon atoms, polyamides, phosphoric acid amides and sulfonic acid amides.

2. The process of claim 1 wherein the esterification reaction is conducted at a ratio of terephthalic acid to 1,4-butanediol of from 1:1.6 to 1:2.0 and at a reaction temperature of 210° to 230° C.

3. The process of claim 1 wherein the acid amide compound is used in an amount of from 0.0005 to 5 percent by weight based on the terephthalic acid.

4. The process of claim 1 wherein the acid amide compound is added to the esterification reaction mixture before the esterification reaction or in the initial stage of the esterification reaction.

5. The process of claim 1 wherein the acid amide compound is added in portions during the esterification reaction.

6. The process 1 of claim 1 including adding as a third component, an acid, a diol, or both.

7. A process for manufacturing polytetramethylene terephthalate, comprising subjecting terephthalic acid and 1,4-butanediol to an esterification reaction in the presence of at least one esterification catalyst and then subjecting the product from the completed esterification reaction to a condensation-polymerization reaction, the esterification reaction being carried out at a molar ratio of terephthalic acid to 1,4-butanediol of from 1:1.6 to 1:2.0 at a reaction temperature of 210° to 230° C. in the presence of from 0.0005 to 5 percent by weight based on the terephthalic acid of at least one acid amide compound selected from the group consisting of urea, a derivative thereof, mono-carboxylic acid amides having 1 to 9 carbon atoms, poly-carboxylic acid amides having 1 to 9 carbon atoms, polyamides, phosphoric acid amides and sulfonic acid amides.

8. The process of claim 7 wherein the acid amide compound is added to the esterification reaction mixture before the esterification reaction or in the initial stage of the esterification reaction.

9. The process of claim 7 wherein the acid amide compound is added in portions during the esterification reaction.

10. The process of claim 7 wherein the acid amide compound is used in an amount of from 0.001 to 0.5 percent by weight based on the terephthalic acid.

11. The process of claim 7 wherein the acid amide compound is selected from the group consisting of N-methylurea, N-ethylurea, N-phenylurea, dicyandiamide, melamine, dimethylformamide, oxalamide, 6-nylon, 6,6-nylon, 12-nylon, hexamethylphosphoramide, and sulfamide.

12. The process of claim 7 wherein the esterification catalyst is added in an amount of from 0.005 to 0.2 percent by weight based on the terephthalic acid.

13. The process of claim 12 wherein the esterification catalyst is selected from the group consisting of tetramethyl titanate, tetraisopropyl titanate, tetra-n-butyl titanate, tetra(2-ethylhexyl) titanate, their hydrolyzates and their ester interchange products.

14. The process of claim 7 including adding as a third component, an acid, a diol, or both.

15. The process of claim 14 wherein the acid is selected from the group consisting of isophthalic acid, adipic acid, sebacic acid, hexahydroterephthalic acid, phenylidene dicarboxylic acid, and 2,6-naphthalene dicarboxylic acid.

16. The process of claim 14 wherein the diol is selected from the group consisting of ethylene glycol, 2-methyl-1,3-propanediol, neopentyl glycol, 1,6-hexanediol and bisphenol A.

* * * * *